No. 688,472. Patented Dec. 10, 1901.
R. KNIETSCH.
APPARATUS FOR THE MANUFACTURE OF SULFURIC ANHYDRID.
(Application filed Nov. 23, 1899.)
(No Model.) 2 Sheets—Sheet 1.

No. 688,472. Patented Dec. 10, 1901.
R. KNIETSCH.
APPARATUS FOR THE MANUFACTURE OF SULFURIC ANHYDRID.
(Application filed Nov. 23, 1899.)
(No Model.) 2 Sheets—Sheet 2.

WITNESSES:
H. L. Reynolds.
Charles J. Rathjen

INVENTOR
Rudolf Knietsch
BY
Gifford & Bull
ATTORNEYS.

UNITED STATES PATENT OFFICE.

RUDOLF KNIETSCH, OF LUDWIGSHAFEN, GERMANY, ASSIGNOR TO THE BADISCHE ANILIN- & SODA-FABRIK, OF LUDWIGSHAFEN, GERMANY, A CORPORATION OF GERMANY.

APPARATUS FOR THE MANUFACTURE OF SULFURIC ANHYDRID.

SPECIFICATION forming part of Letters Patent No. 688,472, dated December 10, 1901.

Original application filed July 14, 1898, Serial No. 685,969. Divided and this application filed November 23, 1899. Serial No. 738,008. (No model.)

*To all whom it may concern:*

Be it known that I, RUDOLF KNIETSCH, doctor of philosophy, a subject of the King of Prussia, German Emperor, residing at Ludwigshafen-on-the-Rhine, in the Kingdom of Bavaria and Empire of Germany, have invented new and useful Improvements in Apparatus for the Manufacture of Sulfuric Anhydrid, of which the following is a specification.

In my application, Serial No. 685,969, of July 14, 1898, I have described the apparatus which is the subject of this application and have included it within the generic claims, and I have filed this as a division of said application for the purpose of securing specific claims for said apparatus.

The form of apparatus here particularly described and claimed is specially adapted for operating with a gas rich in sulfur dioxid.

Figure 1:
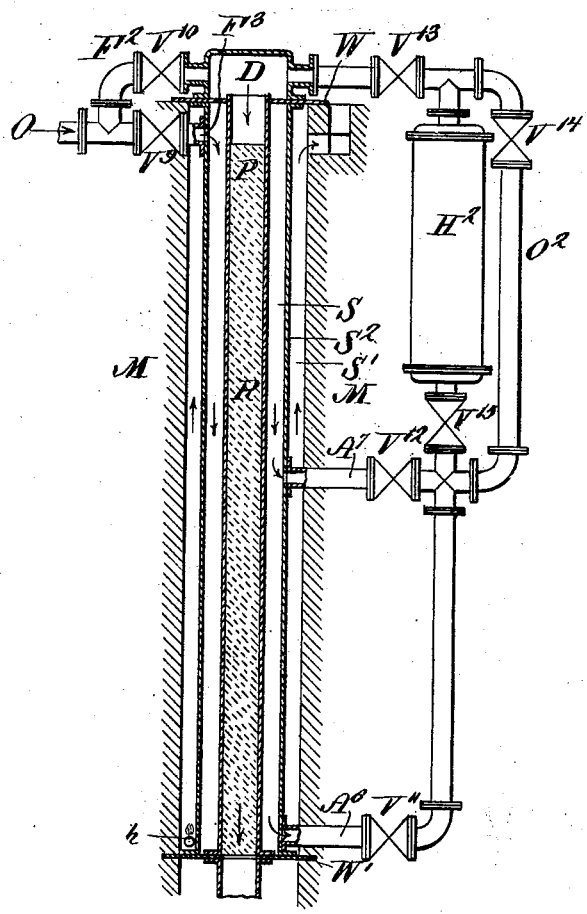
Figure 2:
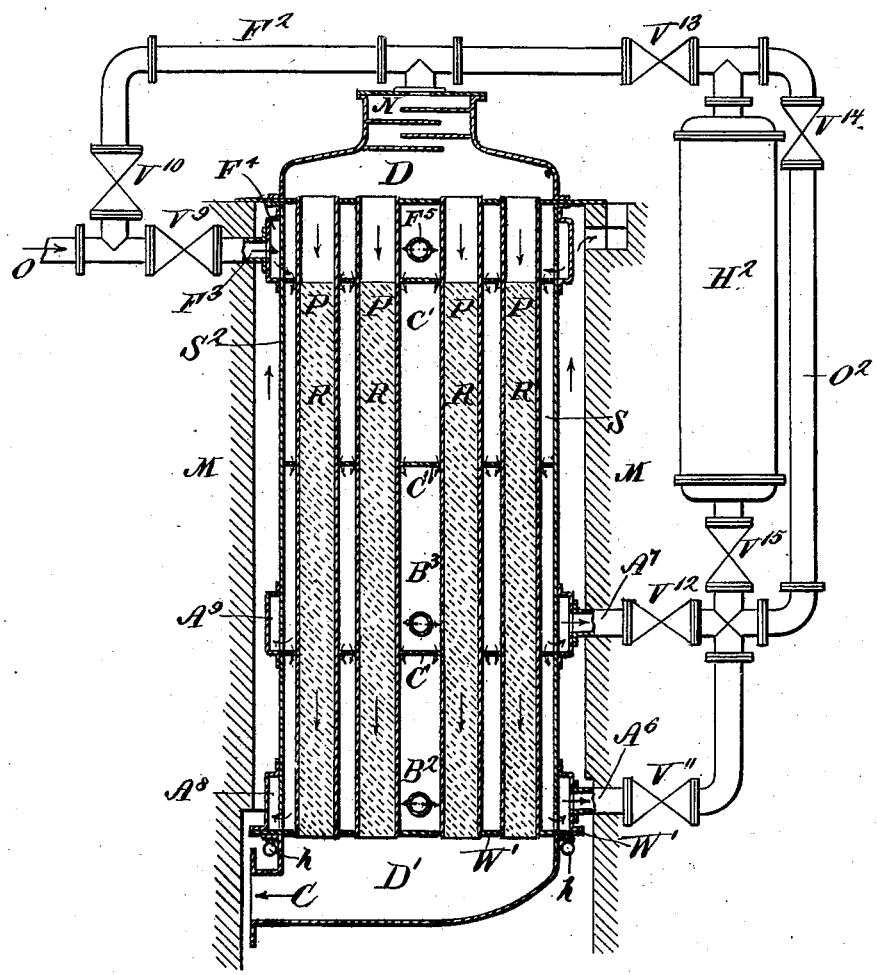

In the accompanying drawings, Figure 1 represents a vertical section of a single contact-chamber, which is represented by the pipe or tube R. Fig. 2 is a vertical section of apparatus containing a plurality of such contact-chambers represented by the tubes or pipes R and also suitable means for thoroughly mixing the gas to be treated, equalizing its temperature, and distributing it through the apparatus.

Referring first to Fig. 1, M represents brickwork; R, the contact-chamber, containing the contact substance, as indicated by broken section-lines. The contact-chamber R is surrounded by the annular space S, which is formed by the wall $S^2$, which may be of sheet-iron. About this is the annular space S', inclosed between the wall $S^2$ and the brickwork M. W and W' represent the tube-plates, situated, respectively, at the top and bottom of the contact-chamber and into which the ends of the contact-chamber are inserted. L is an opening allowing of the ventilation of the annular space S'. Within and at the bottom of the passage S', $h$ represents a source of heat which is easily and quickly regulated—for instance, gas-flames. The gas to be treated enters at O and is led through $F^3$ to the hottest part P of the contact substance in R. In this way the entering gas energetically cools this reaction zone and keeps it below the decomposition-point of the sulfuric anhydrid being formed. The cooling gas-current can leave the passage S through $A^6$ or $A^7$, or through both, and then through the cooler $H^2$ to D, or through $O^2$ and $H^2$ to D, or through $O^2$ to D, depending upon whether the gas leaving $A^6$ or $A^7$, or both, has the proper temperature for the favorable operation of the apparatus or not. Also, depending upon the temperature of the gases entering D by way of $O^2$ or $H^2$, or both, part of the gas to be treated may enter D directly through $F^2$. All this regulation can be effected by the valves $V^9$ $V^{10}$ $V^{11}$ $V^{12}$ $V^{13}$ $V^{14}$ $V^{15}$.

Fig. 2 differs from Fig. 1 in the addition of a plurality of tubes R and of baffle-plates C' in the passage S; also, in a circumferential passage $F^4$ and a transverse passage $F^5$, whereby the gas from $F^3$ is distributed in the passage S; also, the circumferential passages $A^8$ and $A^9$ and transverse passages $B^2$ and $B^3$, whereby the gas entering the passage at $A^8$ and $A^9$ is taken from the passage S at various points. There is in addition the mixer N in the cover, whose function is to thoroughly mix the gas, and thus equalize the temperature of the mass in the cover D before it enters the contact-chambers R. The gas containing the sulfuric anhydrid leaves the apparatus by way of the chamber D' and opening C.

I claim—

1. In an apparatus for the manufacture of sulfuric anhydrid by the contact process, in combination with the contact material, a receptacle for the same containing ingress and egress openings, an inclosure forming a cooling-medium passage adjacent to said receptacle and provided with ingress and egress openings arranged directly with respect to the ingress and egress openings of said receptacle, whereby the current of cooling medium flows in the same direction as the gases which pass through said contact material.

2. In an apparatus for the manufacture of sulfuric anhydrid by the contact process, in combination with the contact material, a receptacle for the same containing ingress and egress openings, an inclosure forming a cooling-medium passage adjacent to said receptacle and provided with ingress and egress openings; the said cooling-medium ingress-opening being arranged approximately opposite the ingress end of said contact material whereby the said cooling medium at its initial temperature is caused to impinge against the contact-material receptacle at substantially its zone of highest temperature.

3. In an apparatus for the manufacture of sulfuric anhydrid by the contact process, in combination with the contact material, a receptacle for the same containing ingress and egress openings, an inclosure forming a cooling-medium passage adjacent to said receptacle and communicating with said ingress-opening, a conduit whereby said passage is supplied with gas containing sulfur dioxid and oxygen, a regulator for the temperature of the gas on its way from said cooling-medium passage to the contact material, means for regulating the rate of flow and direction of the gas to be operated upon and means $h$ for heating the apparatus.

4. In an apparatus for the manufacture of sulfuric anhydrid by the contact process, in combination with the contact material, a receptacle for the same containing ingress and egress openings, an inclosure forming a passage adjacent to said receptacle, a conduit whereby said passage is supplied with gas containing sulfur dioxid and oxygen, valved conduits $A^6$ and $A^7$ whereby said gas is removed at different points from said passage and a conduit whereby said conduits $A^6$ and $A^7$ communicate with said ingress-opening.

5. In an apparatus for the manufacture of sulfuric anhydrid by the contact process, in combination with the contact material, a receptacle for the same containing ingress and egress openings, an inclosure forming a cooling-medium passage adjacent to said receptacle and provided with an opening for the ingress of said cooling medium and a plurality of openings for the egress thereof.

6. In an apparatus for the manufacture of sulfuric anhydrid by the contact process, in combination with the contact material, a receptacle for the same containing ingress and egress openings, an inclosure forming a cooling-medium passage adjacent to said receptacle, a conduit whereby said passage is supplied with gas containing sulfur dioxid and oxygen, a conduit whereby said gas is conducted from said passage to said ingress-opening, a heater $H^2$ for the same and a by-pass conduit $O^2$ around said heater.

7. In an apparatus for the manufacture of sulfuric anhydrid by the contact process, in combination with the contact material, a receptacle for the same containing ingress and egress openings, an inclosure forming a cooling-medium passage adjacent to said receptacle, a conduit supplying gas containing sulfur dioxid and oxygen, two valved conduits $F^2$ and $F^3$ whereby said supply-conduit is connected respectively with said ingress-opening and said cooling-medium passage and a valved conduit whereby said cooling-medium passage is connected with said ingress-opening.

In testimony whereof I have hereunto set my hand in the presence of two subscribing witnesses.

RUDOLF KNIETSCH.

Witnesses:
ERNEST F. EHRHARDT,
BERNHARD C. HESSE.